Feb. 14, 1933. C. J. APPENHEIMER ET AL 1,897,036

BABY CARRIAGE

Filed May 18, 1931 2 Sheets-Sheet 1

Inventors:
Carl J. Appenheimer and Charles Mueller
by John Mitchell
Their Attorney

*Inventors:*
Carl J. Appenheimer and Charles Mueller
by John W. Mitchell
*Their Attorney*

Patented Feb. 14, 1933

1,897,036

UNITED STATES PATENT OFFICE

CARL J. APPENHEIMER AND CHARLES MUELLER, OF REGINA, SASKATCHEWAN, CANADA

BABY CARRIAGE

Application filed May 18, 1931. Serial No. 538,050.

Our invention relates to improvements in baby carriages and the like having particular reference to auxiliary running gear for structures of such a character.

One of the objects of our invention is to provide an auxiliary running gear for baby carriages and like vehicles by means of which the body of the vehicles can be maintained on a horizontal level during progress to and from higher and lower levels.

A further object of our invention is to provide an auxiliary running gear of such a character normally maintained inoperative or individually inoperative but automatically actuated to drop below the level of the main carriage supporting elements and lock in a depending position to bring the running gear into individual operation to assist in supporting the carriage during passage over curb stones, stairs and the like, avoiding tilting the carriage body from its normal horizontal position.

A still further object of our invention is to provide an auxiliary truck or running gear for baby carriages suspended to yieldingly support the carriage on a common plane with the usual rotatable supporting elements for the vehicle in cooperation therewith.

With the above and other objects in view which will be made apparent in the accompanying description our invention resides in the combination of parts hereinafter more particularly described and claimed, reference being had to the accompanying drawings wherein like characters of reference indicate like parts throughout the different views and wherein:—

Fig. 4 is a view illustrating operation of the auxiliary running gear in its passage over obstacles such for example as curb stones and the like.

Figure 1:
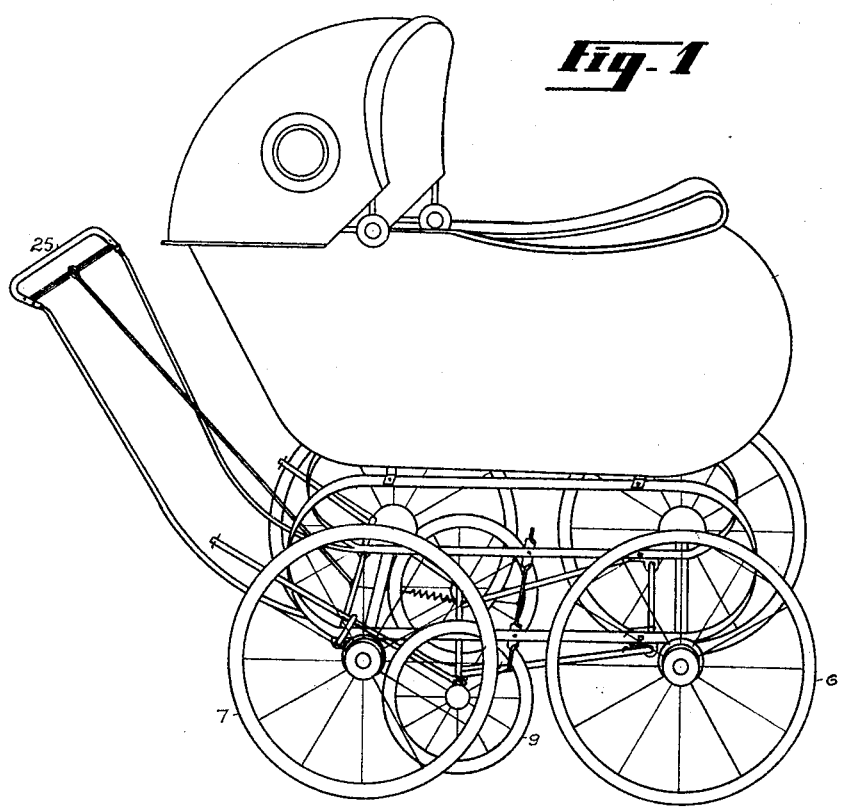
Fig. 1 is a side view of a baby carriage with our improved auxiliary running gear attached the latter being shown elevated as it would appear when the carriage is being operated upon a level surface.
Figure 2:
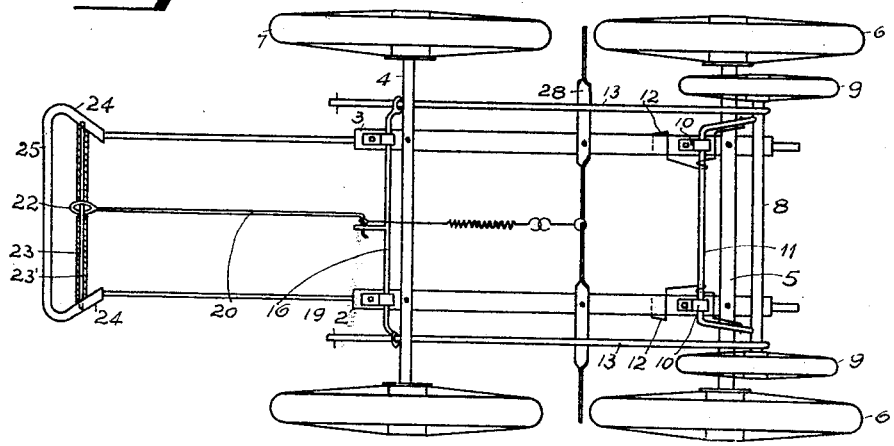
Fig. 2 is an inverted view of the carriage frame structure with the auxiliary running gear attached in operative position.

Having reference to the drawings 1 indicates generally the body of the carriage which would be yieldingly supported by the usual spring structure on longitudinally extended spaced frame bars 2 and 3 supported on axles 4 and 5 with front and rear wheels rotatable thereon respectively indicated at 6—6 and 7—7.

Our auxiliary running gear or truck is mounted intermediate the front and rear wheels of the carriage and for convenience of operation is preferably constructed of reduced dimensions relative to the main supporting elements of the carriage. The said truck consists of an axle 8 having rotatable thereon wheels 9—9 spaced apart intermediate the main wheels of the carriage and of less width than the carriage elements. Suspended from the frame bars 2 and 3 by means of bearing caps 10—10 secured to the said bars is an angled bar 11 rotatable in the said bearing caps. The extremities of the depending arms of the said bar are welded or similarly attached in fixed engagement with the axle 8 or formed integral therewith.

Encircling the bar 11 are springs 12—12 each of which is formed of a single piece of shaped resilient material having the one end hooked into engagement with its adjacent frame bar and the other end hooked into engagement with the adjacent depending arm of the angled bar 11. The said springs are tensioned to normally depress the auxiliary running gear into an individual operating position, that is below the main wheels of the carriage so as to support the carriage in elevated position on the auxiliary wheels only or in conjunction with either the forward or rear supporting wheels of the carriage.

Loosely engaging the axle 8 are locking arms 13—13 by means of eyes such as indicated at 14 formed on the lower terminations of the said arms. Suspended from the rear of the frame bars 2 and 3 by means of bearing caps 15—15 is an angled locking bar 16 terminating at its forked extremities in eyes 17 through which the arms 13—13 are slidably mounted. Intermediately formed in the arms 13—13 are slotted sections as indicated at 18 engageable with the terminating eyes of the arm 16 and positioned to be so engaged when the auxiliary wheels are elevated to the operative level of the main wheels of the carriage, that is positioned as illustrated in Figure 1.

Intermediately integrally formed on the locking bar 16 is a projecting arm 19 engaged by a rod 20 the outer end of which terminates in an elongated or slotted eye 22, engaged by a resilient bar 23 the ends of which are received in suitable openings formed in the handles 24—24 which carry the push bar 25 for the carriage. The rod 20 is maintained centrally positioned on the bar 23 by rubber sleeves 23' spaced to permit operation of the rod in between. The rod 20 is attached to the projecting arm 19 by turning the end portion of the rod as indicated at 21, at right angles and passing such angled end through a suitable opening in the arm 19 and securing the terminating end thereof by turning the rod at an engaging angle.

The said rod 20 is normally adjusted to permit of bringing the engagement of the locking bar 16 and locking arms 13—13 at a sufficient angle to normally provide a binding or frictional engagement therebetween so that except when the slotted sections 18 of the locking arms are positioned in the eyes of the locking bar, the said arms will be securely locked in position as opposed to an upward movement of the locking arms. Such locking however by virtue of the engaging relationship between the eyes and locking arms would permit the arms to slide downward through the eyes without binding. By turning the locking bar 16, as more clearly indicated by the dotted lines in Figures 3 and 4, until the arms of the said bar are approximately at right angles to the locking arms such frictional or binding engagement will be largely done away with allowing a comparatively free movement of the arms. When the terminating eyes 17 of the locking bar are in engagement with the slotted sections of the locking arms a greater freedom of movement therebetween is permitted allowing the auxiliary wheels to yield in the face of irregularities of the road surface encountered by the main carriage wheels such yielding being permissible to the extent of the slotted sections 18. It might be noted that the terminations of the slotted sections are graduated or sloped to prevent any unintentional binding of the locking arms during sliding movement in the eyes 17.

To the angled termination 21 of the rod 20 attaches a spring 26 connected by a link 27 to the brake bar 28 of the carriage or similar conveniently located transverse bar. The said spring 26 is tensioned to normally maintain the locking bar 16 turned sufficiently to maintain the binding engagement between the said bar and locking arms 13—13 as hereinbefore described. The operator of the device when grasping the push bar 25 has merely to include the resilient bar 23 in his grasp and bend such resilient bar towards the handle or push bar to turn the locking bar 16 in opposition to the spring 26 and disengage the locking arms 13—13. Upon release of such pressure the spring 26 would restore the locking bar to its normal position.

In the operation of the carriage when passing from one level to another as for example over curbstones, up and down stairs and the like, the auxiliary running gear or truck is made use of. When the carriage is operated on a level as indicated in Figure 1 the auxiliary truck is pushed up to the operating level of the main wheels of the carriage bringing the notched portion of the locking arms 13—13 into engagement with the terminating eyes of the arms on the locking bar 16 such action being brought about by the operator merely exerting a downward pressure on the push bar of the carriage. Such elevation of the auxiliary wheels is in opposition to the springs 12—12 which if the auxiliary truck were not supported would serve to automatically depress the said truck, the weight of the carriage being sufficient to normally hold the truck in its elevated position.

Figure 4:
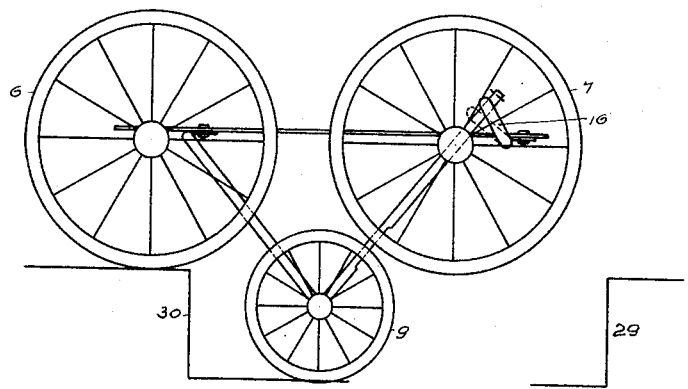
Figure 5:
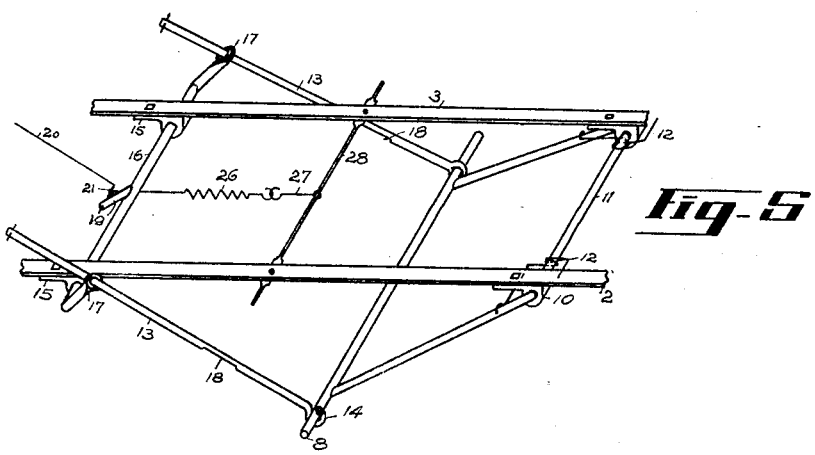
Fig. 5 is a perspective view of part of the carriage frame with the main portion of the auxiliary running gear attached.

For example, if, as illustrated in Figure 4 the carriage came to the edge of the curb stone indicated by the numeral 29, passage of the auxiliary wheels beyond the upper supporting surface would allow the auxiliary truck to drop to the depth of the curb stone when the locking bar and locking arms would engage temporarily fixing the position of the auxiliary truck in so far as reverting to its elevated position is concerned so that momentarily the carriage would be supported on the rear wheels 7—7 and auxiliary wheels 9—9. The carriage could then be wheeled so supported until the curb stone indicated at 30 were encountered when the main front wheels 6—6 having cleared the curb stone the release bar 23 would be pressed disengaging the locking bar and locking arms and allowing the auxiliary truck to be folded up to its elevated position the carriage proceeding on the main supporting wheels.

Figure 3:
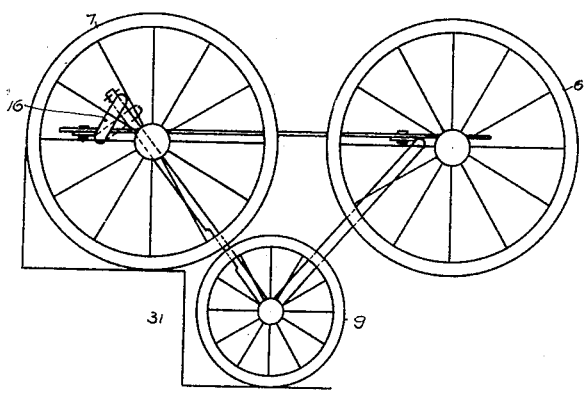
Fig. 3 is a side view of a baby carriage illustrated during passage up or down a stairs showing the auxiliary runing gear depressed in operative position.

Figure 3 illustrates application of the device in passage up and down a stairs indicated at 31. In this it might be noted that for use of the present device the operator would always be above the carriage level, that is in passage down a stairs the carriage would be wheeled forward and in passage up a stairs the carriage would be wheeled backward. In this case the carriage is always supported on two sets of wheels operating on different levels so that the body of the carriage is maintained in a horizontal position.

Obviously the structure as herein described would be attachable to any ordinary form of carriage or with minor variations could be adapted for such attachment and not necessarily limited to attachment to the main carriage structure as illustrated and described.

Having thus described our invention what we claim is:—

1. In a baby carriage having a frame and main rotatable supporting elements, an auxiliary running gear swingingly suspended from said frame, springs normally depressing said running gear below the horizontal supporting plane of said elements, a locking bar on the carriage, locking arms on the running gear in sliding engagement with the locking bar, said arms being formed with longitudinal recessions disposed to be engageable with the locking bar when the auxiliary running gear is operating on a common horizontal plane with the main supporting elements to permit a limited yielding movement of the running gear, a spring normally holding said locking bar and arms frictionally engaged as opposed to an upward movement of the arms, and a manual release for said locking bar.

2. In a baby carriage having a frame, handles for said frame and main rotatable supporting elements, an auxiliary running gear swingingly suspended from said frame, springs normally depressing said running gear, an angled locking bar formed with terminating eyes mounted to turn on the frame and provided with a projecting arm, locking arms fixed to the running gear slidable in said eyes, a spring connecting said projecting arm and frame normally turning said locking bar to frictionally bind said arms in said eyes as opposed to an upward movement of the arms, and a manual release for turning said bar to permit a sliding movement of said arms said release comprising a resilient bar transversely disposed in the handles for the frame, and a link connecting said resilient bar and the projecting arm of the locking bar.

3. In a baby carriage having a frame and main rotatable supporting elements, an auxiliary running gear swingingly suspended from said frame, an angled locking bar formed with terminating eyes mounted to turn on the frame, locking arms on the running gear slidable in said eyes frictionally engageable therewith and formed with longitudinal tapered recessions disposed to be positioned in said eyes when the running gear is operating on a common horizontal plane with the main supporting elements, said recessions being adapted to eliminate the frictional engagement with said eyes throughout the length of the recessions, a spring normally turning said locking bar to frictionally bind said arms and eyes as opposed to an upward movement of the arms, a manual release for said locking bar, and springs normally depressing the running gear and providing a yielding support therefor when the eyes on the locking bar are operating in the recessions on the locking arms.

4. In a baby carriage having a frame and front and rear main supporting elements, an auxiliary running gear swingingly suspended from said frame intermediate the main supporting elements, a bar transversely mounted on the frame, said bar being formed with terminating eyes, a pair of spaced apart arms on the running gear slidable in said eyes, a spring actuating said bar to frictionally engage said arms, and a manual release for the bar.

5. In a baby carriage having a frame and front and rear main supporting elements, an auxiliary running gear swingingly suspended from said frame intermediate the main supporting elements, springs depressing said running gear, a bar transversely mounted on the frame, said bar being formed with terminating eyes, a pair of spaced apart arms on the running gear slidable in said eyes, a spring actuating said bar to frictionally engage said arms, and a manual release for the bar.

CARL J. APPENHEIMER.
CHAS. MUELLER.